United States Patent [19]

Roy

[11] Patent Number: 5,299,284

[45] Date of Patent: Mar. 29, 1994

[54] PATTERN CLASSIFICATION USING LINEAR PROGRAMMING

[75] Inventor: Asim Roy, Tempe, Ariz.

[73] Assignee: Arizona Board of Regents, acting on behalf of Arizona State University, Tempe, Ariz.

[21] Appl. No.: 506,243

[22] Filed: Apr. 9, 1990

[51] Int. Cl.$^5$ .............................................. G06F 15/18
[52] U.S. Cl. ........................................ 395/22; 395/24
[58] Field of Search ................ 364/513, 900, 907; 382/14, 15; 395/21, 22, 24, 27

[56] References Cited

U.S. PATENT DOCUMENTS

| | | | |
|---|---|---|---|
| 3,688,267 | 8/1972 | Iijima et al. | 340/146.39 |
| 3,906,446 | 9/1975 | Iijima et al. | 340/146.3 |
| 3,950,733 | 4/1976 | Cooper et al. | 364/900 |
| 4,254,474 | 3/1981 | Cooper et al. | 364/900 |
| 4,760,604 | 7/1988 | Cooper et al. | 382/15 |

FOREIGN PATENT DOCUMENTS 57-62468 4/1982 Japan ............................. G06K 9/66

OTHER PUBLICATIONS

Suzuki et al., "A Study of Regular Architectures for Digital Implementation of Neural Networks", 1989 IEEE International Symposium on Circuits and Systems, pp. 82-85.

Jonnada et al., "Clustering and Pattern Class Determination Using Linear Programming", *Proceedings of the 1972 International Conference on Cybernetics and Society*, pp. 221-225.

Primary Examiner—Allen R. MacDonald
Attorney, Agent, or Firm—Richard R. Mybeck

[57] ABSTRACT

A method and apparatus (system) is provided for the separation into and the identification of classes of events wherein each of the events is represented by a signal vector comprising the signals $x1, x2, \ldots, xj, \ldots, xn$. The system in principle is different from neural networks and statistical classifiers. The system comprises a plurality of assemblies. The training or adaptation module stores a set of training examples and has a set of procedures (linear programming, clustering and others) that operate on the training examples and determine a set of transfer function and threshold values. These transfer functions and threshold values are installed on a recognized module for use in the identification phase. The training module is extremely fast and can deal with very difficult pattern classification problems that arise in speech and image recognition, robotics, medical diagnosis, warfare systems and others. The systems also exploits parallelism in both the learning and recognition phases.

12 Claims, 14 Drawing Sheets

PATTERN CLASSIFICATION USING LINEAR PROGRAMMING

INTRODUCTION

The present invention relates generally to means and methods of pattern classification utilizing linear programming formulations and more particularly to pattern classification by machine systems which function to separate and identify classes of information which are not necessarily linearly separable, such as in speech and image recognition, robotics, medical, scientific, and engineering diagnosis and in defense systems.

BACKGROUND OF THE INVENTION

The need for pattern classification by machine or device exists in a number of technological areas such as image classification, target recognition and tracking, speech and character recognition, signal processing including sonar classifier and process monitor, robotics, electronic and radar surveillance, medical, scientific, and engineering diagnosis and like applications.

A number of prior art approaches to solving pattern classification problems have been described. One such approach, known as "neural networks", divides up the computational work to be done among a set of parallel computational elements in order to speed up the work. Since pattern classification is computation-intensive, dividing up the work (parallelizing) among a number of computational devices makes sense if one is to expect real time responses from such devices. Pattern classification, however, involves two phases. One is a learning or training phase (from a set of training examples) in which the system learns or adjusts the parameters of the given mathematical formulae it will use for event identification. The second is a classification phase in which it actually uses the learned formulae to classify speech (words), objects and the like based on the given inputs. An algorithm (method) is usually used for the training of a neural network device. The basic weakness of neural network devices is that they take a long time to train and usually involve an extensive trial and error procedure.

The input to a pattern classification machine is a set of N measurements, and the output is the classification. The input is represented by the N-dimensional vector x, $x=(X_1, X_2 \ldots ,X_N)$, called the pattern vector, with its components being the N measurements. Let $\Omega_x$ be the pattern space which is the set of all possible values that x may assume. Suppose there are K classes. A pattern classification machine will divide $\Omega_x$ into K disjoint decision regions $\Omega_1, \Omega_2, \ldots , \Omega_K$, each corresponding to one class. Sometimes, as will be hereinafter discussed, a class may consist of more than one disjoint region. Thus, the design of a pattern classification machine may be described as finding a rule that divides the pattern space $\Omega_x$ into K decision regions. The parameters of a pattern classification machine are estimated from a set of pattern samples with known classifications, $x_1, x_2, \ldots , x_n$, which is called the training set. As n becomes large, it leads to a machine of near optimum performance. This is machine learning. There are two types of machine learning, supervised and unsupervised. In supervised learning, the classification of each sample of the training set, $x_1, x_2, \ldots , x_n$ is known. This is also called learning with a teacher. In unsupervised learning, or learning without a teacher, the classifications of the training samples are unknown. The present invention deals with supervised learning only.

The fundamental idea in pattern classification is to draw "proper" boundaries for each class region based on the given information (i.e., the training set). Classical statistical techniques (e.g., Gaussian classifier) use certain standard mathematical functions (i.e., specific probability distribution functions) to draw these boundaries. The limitation of these statistical techniques is that they are not flexible enough to form complex decision boundaries and thus can lead to errors. Neural networks, are capable of forming complex decision boundaries.

The present disclosure involves "masking" or "covering" a class region. Any complex nonconvex region can be covered by a set of elementary convex forms of varying size, such as circles and ellipses in the 2-dimensional case and spheroids and ellipsoids in the N-dimensional case. As is well known to practitioners of the art, the terms "convex form", "convex cover", or "convex mask" refer to a set of points congruent with a geometric shape wherein each set of points is a "convex set." Therefore, by definition, geometric shapes such as circles, ellipses, spheres, cubes and the like are convex "forms", "covers", and/or "masks". Thus a complex class region can be approximately covered by elementary convex forms, although overlap of these elementary convex "covers" may occur in order to provide complete and adequate coverage of the region. Sometimes, a cover may extend beyond the actual class region, if there is no conflict in doing so. Nonconvex covers may be used when there is no conflict in doing so.

The idea of "elementary convex covers" is not new in pattern classification. The neural network concept is the same and the proof (by construction) of its ability to handle arbitrarily complex regions is based on partitioning the desired decision region into small hypercubes or some other arbitrarily shaped convex regions. However, as will appear, this basic idea is used quite differently in the present invention.

The back propagation algorithm for training of multilayer perceptrons (see: Rumelhart, D. E., G. E. Hinton, and R. J. Williams, "Learning Internal Representations by Error Propagation," in *Parallel Distributed Processing: Explorations in Microstructure of Cognition, Vol. 1: Foundations.* MIT Press [1986]) is the most widely used algorithm for supervised learning in neural networks. Its objective is to set up class boundaries such that the mean square error is minimized. The steepest descent direction is used for the minimization, but no line search is done in the descent direction. It generally uses the nonlinear logistic (sigmoid) activation function at the nodes of the network. In essence, the back propagation algorithm formulates the pattern classification problem as a unconstrained nonlinear optimization problem and then uses a poor technique for minimization. Just a few of its problems include:(a) slow convergence; (b) getting stuck at a local minimum point; (c) oscillations associated with bigger step sizes (learning rates); and (d) many trials required with different starting points (connection weights), fixed step sizes in the descent direction (learning rates, momentums), and number of hidden layers and nodes to be put in the network structure (i.e., experimenting with the nature of nonlinear function required to draw the boundaries).

The present invention is predicated upon a solution of these prior art problems through the use of linear masking functions and linear programming ("LP") formulations and provides a very fast and reliable solution technique while avoiding the difficulties incurred by the nonlinear optimization of functions.

BRIEF SUMMARY OF THE INVENTION

The present invention relates generally to a system for the separation into and the identification of classes of events wherein each of the events is represented by a signal vector comprising a plurality of input terminals which are adapted to receive signal vectors and a plurality of assemblies connected thereto.

The training phase of the overall system takes a collection of event signals (training examples) from known classes and determines the parameters of the mathematical functions which are used in the classification assemblies of systems. The classification or identification device is configured to compute these mathematical functions in parallel. The parameters of these functions, as determined by the training phase, are installed on the classification device, where they are called "transfer function elements". The classification assembly comprises a plurality of junction elements. Each junction element is capable of accepting a signal ($b_j$) which is not necessarily just an input signal but can also be a product (e.g., $X_i X_j$) or a power (e.g., $X_j^2$) of an input signal. The junction element transfers information obtained from the signal ($b_j$) to a corresponding summing means (i) which is dependent upon the signal ($b_j$) and upon the transfer function ($A_{ij}$) of the element. Summing devices are included in classification assembly for summing the information transferred by a set of junction elements. The classification assembly also includes devices for taking products of input signals $X_i$ and $X_j$ and for taking powers of input signals (e.g. $X_j^2$)

In the training components of the system, any outlier present in the training set is first weeded out. An "outlier" is a given sample or event having characteristics which are not similar to the other members of its class (e.g. the regional dialect problem of the human voice). Outliers are excluded from the training set of samples by clustering or grouping the training examples into classes in which the members are close together. This forces the outliers to fall out and be excluded. Once the outliers have been weeded out, mathematical functions (generally quadratic ones) are developed to cover each class region by means of linear programming, so that at least one of these functions is at least slightly positive for samples in the class and all are at least slightly negative for those that are not in the class. The linear programming technique allows rapid development of the desired mathematical functions (also called "masking functions") from the training set. When a single mathematical function cannot be developed for a class because of its complexity, the training examples in the class are formed into a number of smaller sub-groups (by means of a clustering algorithm) and mathematical functions (masking functions) are developed for each new sub-group separately by means of linear programming. The technique based on linear programming, as hereinafter described, provides a convenient and powerful way of specifying the class of each sample in the training set and verifying the fact that any mathematical function (masking function) developed for a class properly satisfies and accounts for the classification of all samples contained therein.

The linear programming solution will also provide threshold values ($\epsilon$) for determining whether a given function is at least slightly positive or at least slightly negative relative thereto. These threshold values are installed in the classification device by elements herein called "threshold means". To classify a given sample, the classification device will compute the mathematical functions (masking functions) for each of the various classes and then test them against the appropriate threshold value in a threshold determining stage to ascertain their membership in a mask. A threshold element for a function is activated to produce an output when the prescribed value is attained. The attaining of an output from a threshold element indicates the recognition of membership in that masking function by the system.

The identification portion of the system essentially comprises means responsive to the outputs of the various threshold stages for producing outputs which represent groups of events representing distinct classes. This last-named means includes a plurality of class output means, each being selectable to produce an output indicating the occurrence of events falling within a single class.

Accordingly, in the training phase of the system, mathematical functions (generally quadratics) are developed from the training examples by means of linear programming which properly separate and identify classes of events. These functions are developed so that for an event falling within the defined class, one of the class functions is at least slightly positive, and for an event not falling within the defined class all of the class functions are at least slightly negative. These mathematical functions (masking functions) are then installed on the classification device. The classification device is a system which computes these masking functions in parallel by using many small computational elements in parallel. The parameters of the mathematical (masking functions) functions, obtained in the training phase, are installed on the classification device as transfer function elements and threshold values. Once the parameters are installed, the classification device is in the "trained" mode of operation for the recognition and separation of a particular group of related events.

In an adaptation mode, when the classification device transfer function elements and threshold values are allowed to be changed or readjusted based on events or examples obtained subsequent to training, an event that is misclassified by the classification device is sent to the training system. The training system then adjusts or re-solves the mathematical (masking) functions to account for the misclassified examples, and the new parameters are then fed back to the classification device for installation.

Accordingly, it is an important objective of this invention to provide new and improved means and methods for pattern classification which can learn fast and still exploit parallelism in the classification phase in a manner similar to neural network devices.

Another objective of this invention is to provide a new and improved system for pattern classification which is capable of separating and identifying a number of classes in a space of arbitrary dimensionality, which are not linearly separable and which is not dependent upon the extent of clustering of classes.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

DESCRIPTION OF THE PREFERRED EMBODIMENTS

The present invention relates to means and methods for the separation and identification of classes of events wherein each event is represented by a classifiable idiosyncratic signal vector.

Figure 1:
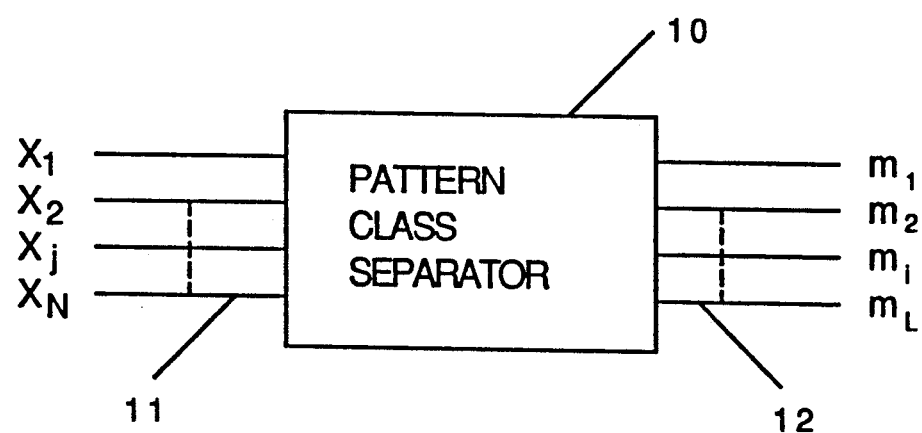
FIG. 1 is a schematic illustration of a pattern class separator constructed in accordance with the present invention.
Figure 2:
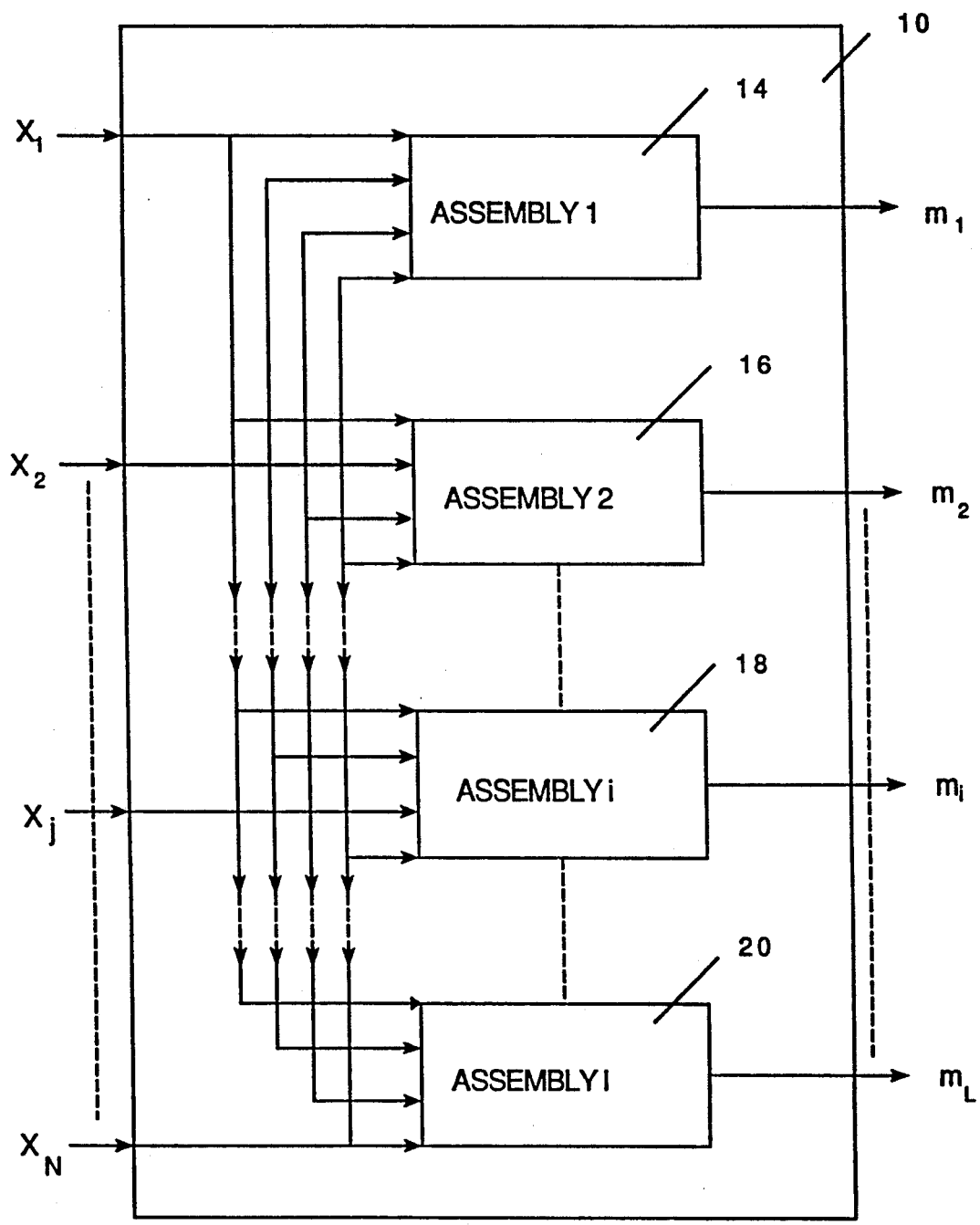
FIG. 2 is a schematic illustration depicting the inputs, outputs and internal structures of the pattern class separators of FIG. 1.

As shown in FIG. 1, pattern class separator 10, comprises a plurality of input terminals 11 for receiving N input signals $X_1, X_2, \ldots X_j, \ldots X_N$ and a plurality of output terminals 12 for providing L output responses $m_1, m_2, \ldots m_i, \ldots m_L$. Pattern class separator 10 comprises a portion of classification device and functions to read and separate incoming signal or patterns into their respective classes by testing membership in the masking functions. As shown in FIG. 2, pattern class separator 10 comprises a first assembly 14, a second assembly 16, assembly i 18, and assembly L 20, schematically represented in block diagram. The vector $X_1, X_2, \ldots X_j, \ldots X_N$, which is the signal coding of a single pattern, is commonly applied to all of the assemblies as shown while the outputs of assemblies 14, 16, 18, 20 produce outputs $m_1, m_2, \ldots m_i, \ldots m_L$, respectively.

Figure 3:
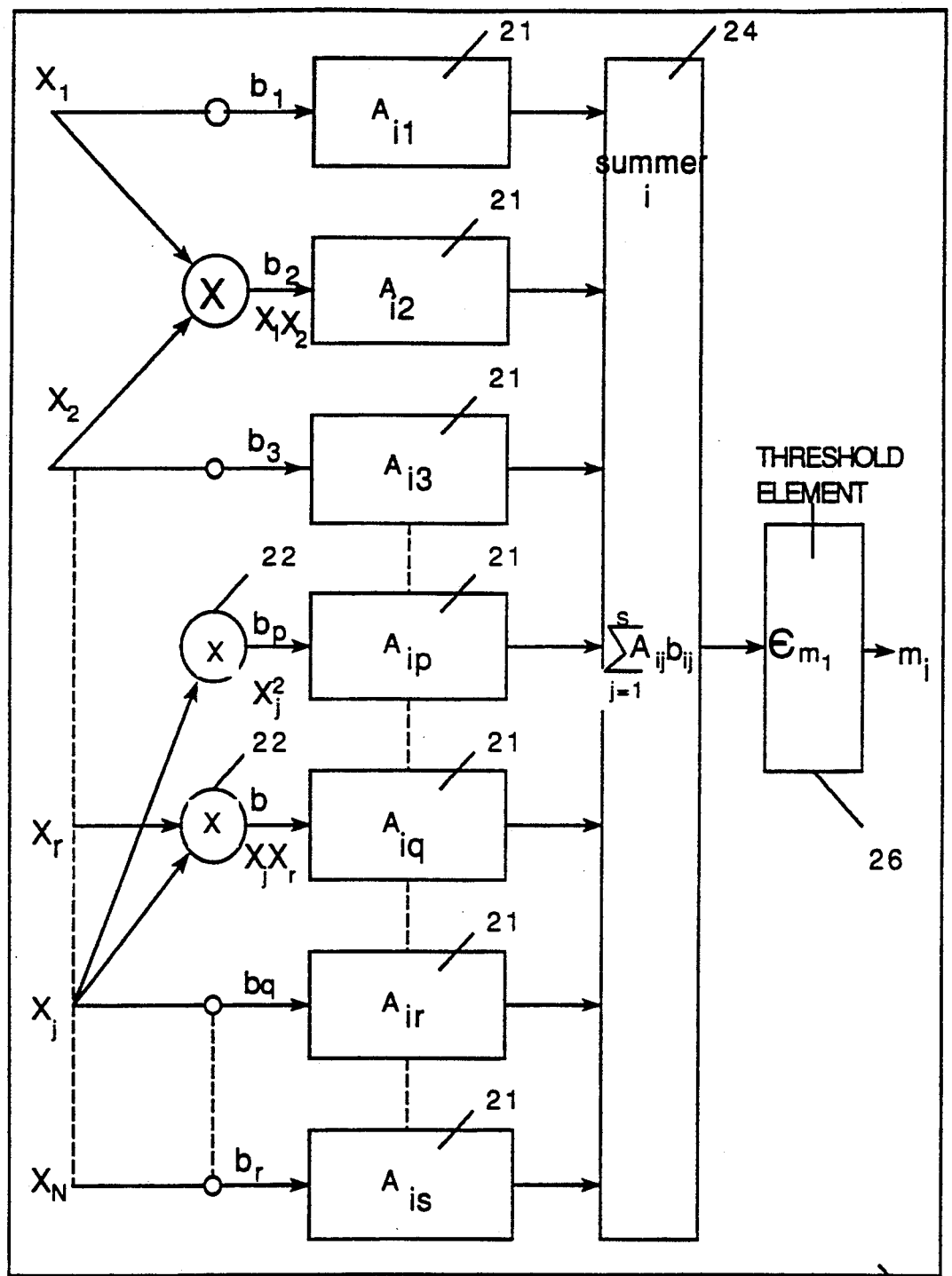
FIG. 3 is a schematic illustration depicting the inputs, outputs and arrangement of internal structures in an assembly, as shown in FIG. 2, when the pattern class separator is operated in the trained mode of operation.

Referring to FIG. 3 which illustrates a suitable embodiment of assembly i 18 which forms a part of the classification device, FIG. 3 shows the signals of the input vector $X_1, X_2, \ldots X_j, \ldots X_N$ applied to the system.

The input $(b_j)$ to junction element 21 can be a signal $X_i$ itself, the product of signals $X_i X_j$ or some power of a signal $X_j$. The derived signals $(b_j)$ are applied to a matrix of weights $A_{i1}, A_{i2}, \ldots A_{ij}, \ldots A_{it}$ at the junction elements. The first subscript of an A element is the same as its assembly descriptor. The second subscript designates the associated input number and junction element. The device hereof includes means 22 for computing power and product terms and means 24 for collecting terms of input signals, such need being dictated by the usual quadratic mathematical functions resulting from training the system.

In the operation of the pattern class separator 10, consider a situation in which there are K external classes to be separated and identified.

Figure 4:
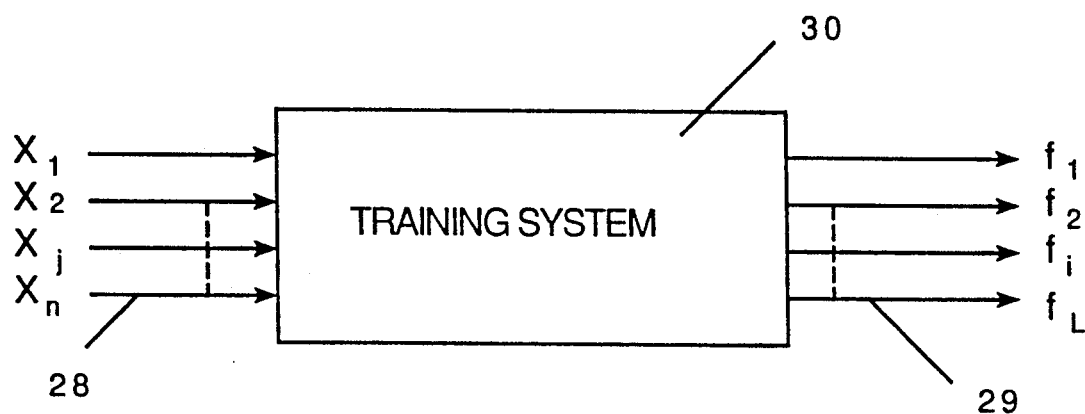
FIG. 4 is a schematic illustration of a pattern class training system embodying the present invention.
Figure 13:
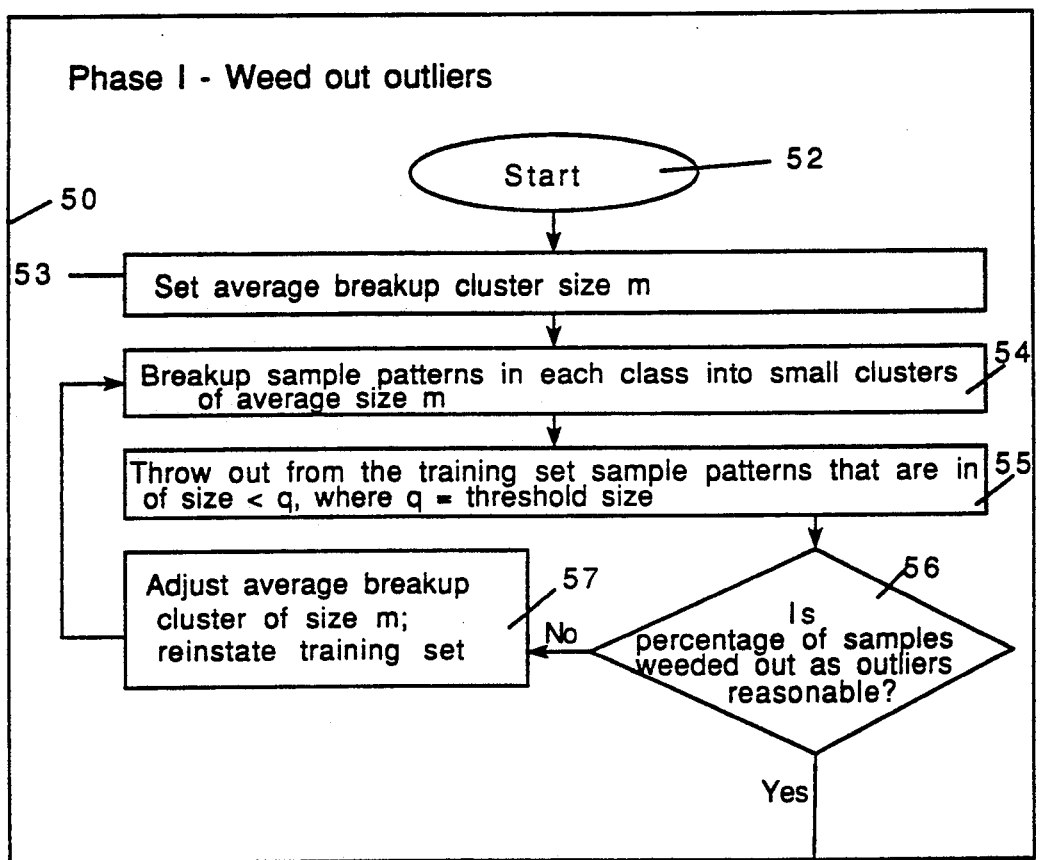
FIG. 13 is a general flow chart illustrating the training method of the present invention.
Figure 13:
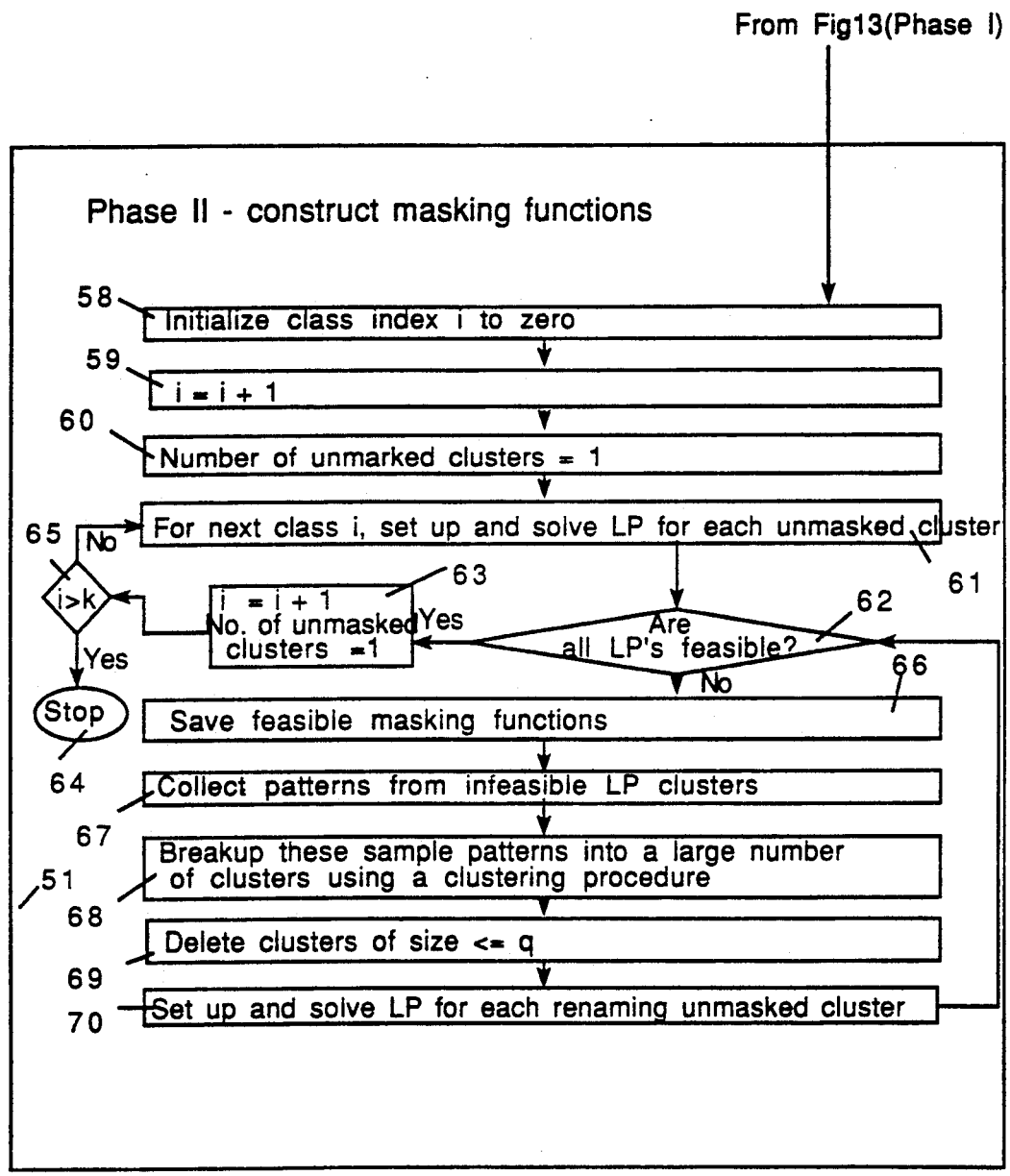

The training system, as shown schematically in FIG. 4 and by the flow diagram in FIG. 13, receives as input $x_1, x_2, \ldots x_j, \ldots x_n$ representatives of the various different classes, each representative being coded into signals $X_1, X_2, \ldots X_j, \ldots X_N$ by means of a coding scheme. After these representatives of K external classes have been coded in the signal space $\Omega_x$, they constitute N-dimensional vectors in an N-dimensional hyperspace where they form clusters with arbitrary nonlinear boundaries. The set of usually quadratic mathematical functions or masking functions developed in the training system, by using linear programming, for a particular class j achieves the identification of its class boundaries. Thus, if $p_k$ is the number of masking functions required for class k, $f=1 \ldots K$. Let $f^k_1(x), \ldots, f^k_{p_k}(x)$ denote these masking functions for class k. Each assembly unit in FIG. 2 t corresponds to a masking function. Input pattern x' will belong to class j if and only if one or more of its masking functions is at least slightly positive, i.e., above a positive threshold value, and the masking functions for all other classes is at least slightly negative, i.e., below a negative threshold value. Threshold element means 26, as shown in FIG. 3, performs a threshold test for each masking function or assembly. Means 26 provides an output signal "1" if the input equals or exceeds the threshold and an output signal of "0" if the input is less than the threshold. As expressed in mathematical notation, an input pattern x, is in class j, if and only if:

$$f^j_i(x') \geq \epsilon_1 \text{ for at least one mask } i, i=1 \ldots p_j, \text{ and}$$
$$f^k_i(x') < -\epsilon_i \text{ for all } k \neq j \text{ and } i=1 \ldots p_k \quad (1)$$

enable the masking functions to effectively achieve the identification of class boundaries. Each assembly in FIG. 2 corresponds to a separate masking function for a total of L masking functions when $$L = \sum_{r=1}^{k} P_r$$

The number of masking functions L will normally be greater than K since each class, due its complexity, may need more than one mask.

FIG. 4 shows the inputs 28 and outputs 29 of the training system 30 where the outputs $f_1, f_2, \ldots f_3, \ldots f_L$ correspond to the masking functions generated. The input 28 to the training device is a set of pattern samples with known classifications, $x_1, x_2, \ldots x_n$, which is called the training set. A pattern classification machine operates in two phases, a training phase, and a classification phase. In supervised learning, as is used in this invention, the classification of each sample of the training set, $x_1, x_2, \ldots x_n$ is known.

Figure 5:
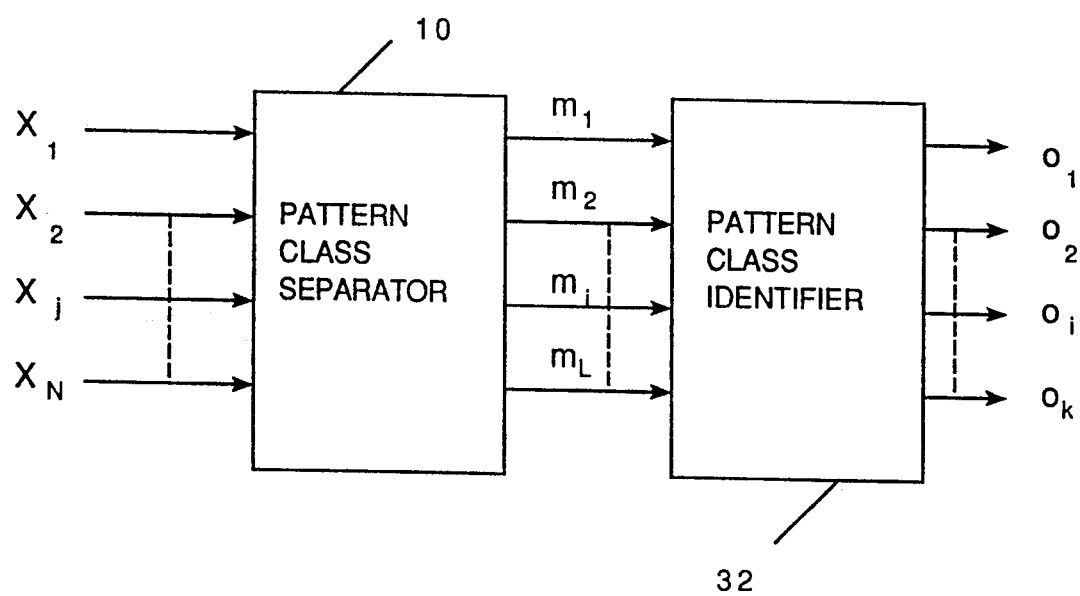
FIG. 5 is a schematic illustration of the combination of a pattern class separator and a pattern class identifier in accordance with the present invention.
Figure 6:
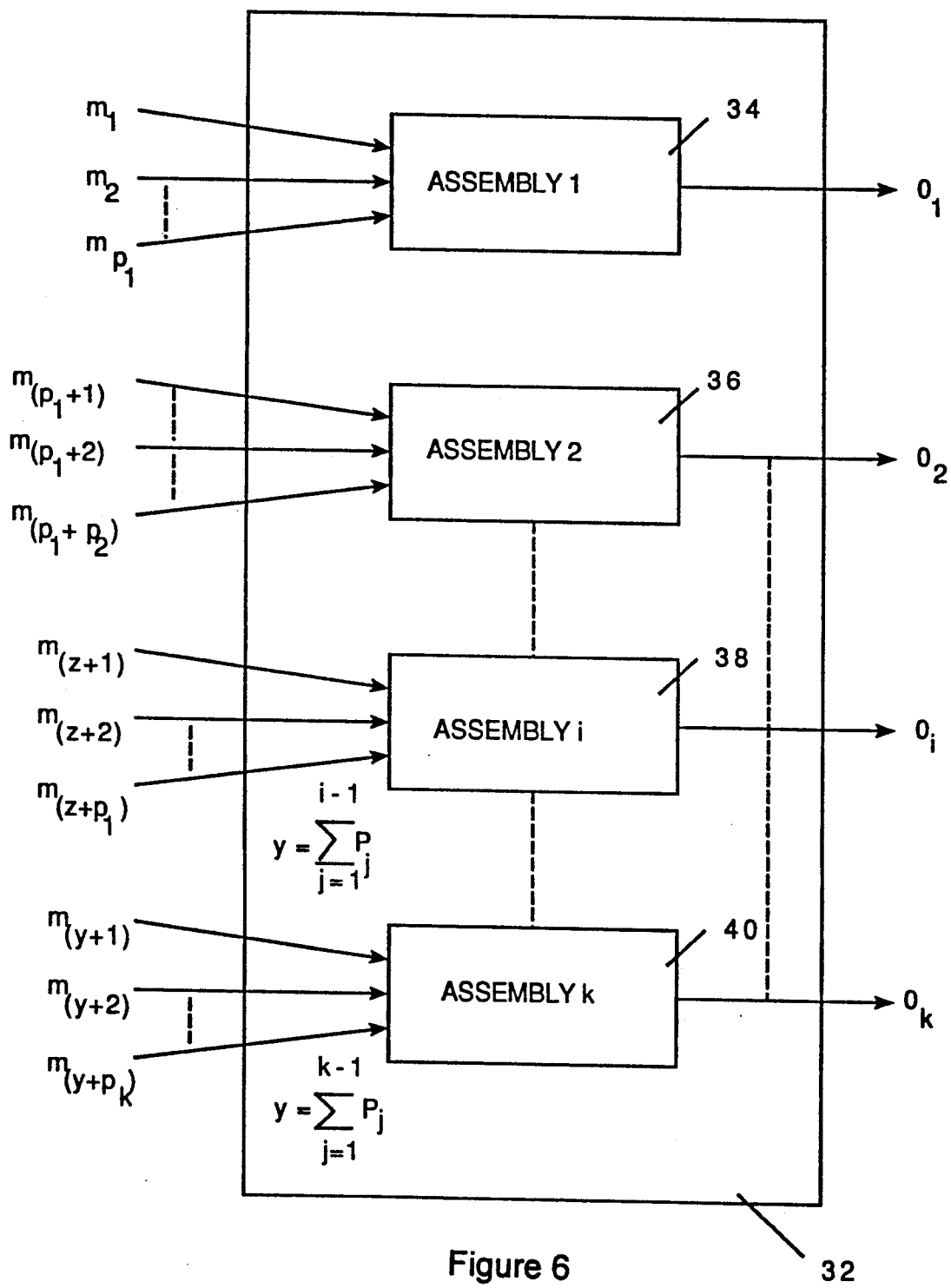
FIG. 6 shows the inputs, outputs and internal connections of the pattern class identifier shown in FIG. 5.

Referring to FIG. 5, the outputs $m_1, m_2, \ldots m_i, \ldots m_L$ from pattern class separator 10 are applied to pattern class identifier 32 which in turn generates outputs, designated outputs of pattern class identifier $O_1, O_2, \ldots O_i, \ldots O_k$, which indicate discrete class identifications. FIG. 6 shows in more detail the internal structure of pattern class identifier 32, in particular a first assembly 34, a second assembly 36, an l-th assembly 38 and a K-th assembly 40. As shown, the outputs are $O_1, O_2, \ldots O_i, \ldots O_k$, respectively. Each assembly corresponds to a class and so only the outputs ($m_i$'s) from pattern class separator 10 belonging to or associated with a particular class (that is, the masking functions corresponding to that class) are input to the corresponding assembly. Each one of the $O_i$ outputs from the respective assemblies thus identifies a different one of the classes.

Figure 7:
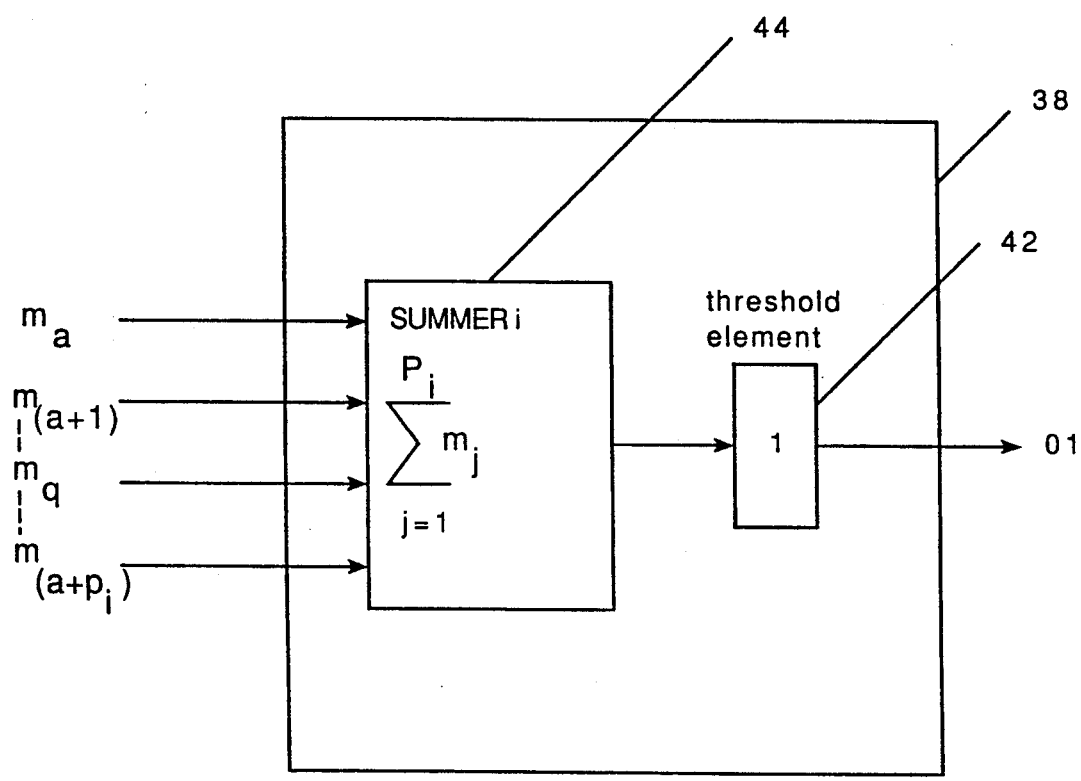
FIG. 7 shows the inputs, outputs and arrangement of internal structures in the assembly i shown in FIG. 6 when the pattern class identifier is operated in the trained mode of operation.

A typical assembly, such as assembly i in FIG. 6, is shown in FIG. 7. Four such assemblies are shown in the classification device 32. As shown in FIG. 7, those output signals from the pattern class separator 10 which correspond to the masking functions associated with class i only are input to assembly i 38, where they are summed and then passed through a threshold unit 42. Threshold means 42 outputs a signal "1" if the input to it from the summer i 44 equals or exceeds the assigned threshold value of 1 (i.e., $O_i=1$) and outputs a signal "0" (i.e., $O_i=0$) if the input is less than the assigned threshold value of 1.

In one practice of the present invention, $p_k$ elementary covers or masks (hereinafter called "masks") are assumed as required to cover a certain decision region k. To classify an input pattern as a member of class k, it is necessary to determine if it falls within the area covered by one of the $p_k$ masks. If the pattern space is two-dimensional and one of the $p_k$ masks is a circle centered at (a,b) and has a radius r, a simple test (or "masking") function can be created to determine the membership of an input pattern within the designated mask. Let $f(X_1, X_2) = r^2 - [(X_1-a)^2 + (X_2-b)^2]$ be the masking function for this circle. If $(X_1', X_2')$ is the input pattern, and if $\theta(X_1', X_2') \geq 0$, then $(X_1', X_2')$ is inside this mask. Therefore, $(X_1', X_2')$ belongs to and is a member of class k; if $f(X_1', X_2') < 0$, then $(X_1', X_2')$ is not inside this mask and other masks will have to be considered before a conclusion can be reached as to the classification of $(X_1', X_2')$. A similar masking function for an ellipse will be:

$$f(X_1', X_2') = 1 - [(X_1-a)^2/c^2 + (X_2-b)^2/d^2]$$

in the usual notation.

In general, if we assume $p_k$ is the number of masking functions required to cover class k, $k=1 \ldots K$, $f^k_1(x), \ldots, f^k_{p_k}(x)$ will denote the masking functions for class k. Then an input pattern x' will belong to class j if and only if one or more of its masks is at least slightly positive, that is, above a small positive threshold value ($\epsilon_j$) and the masks for all other classes are at least slightly negative, that is below a small threshold value $\epsilon_j$. In mathematical notation, an input pattern x' is in class j, if and only if:

$$f_i^j(x') \geq \epsilon_j \text{ for at least one mask } i, i=1 \ldots p_j \text{ and}$$
$$f_i^k(x') < -\epsilon_j \text{ for all } k \neq j \text{ and } i=1 \ldots p_k \quad (1)$$

If all masks are at least slightly negative, or if masks from two or more classes are at least slightly positive, the input pattern cannot be classified.

A variety of elementary convex masks (such as squares, rectangles, triangles and so on for the 2-dimensional case) can be used to cover a decision region. In usual practice, quadratics or quadratic polynomials of the forms $$f(x) = \sum_{i=1}^{N} a_i X_i + \sum_{i=1}^{N} b_i X_i^2 + \sum_{i=1}^{N} \sum_{j=i+1}^{N} c_{ij} X_i X_j + d, \quad (2)$$

and $$f(x) = \sum_{i=1}^{N} a_i X_i + \sum_{i=1}^{N} b_i X_i^2 + c$$

are used as the standard masking function which generate ellipsoids, spheroids etc., in the N-dimensional space. These formulae can also generate nonconvex shapes ("masks") which is acceptable as long as it helps to cover the decision region without encroaching on other decision regions. When developing masks, as hereinafter described, any mask generated must cover only sample patterns of its class and should not cover sample patterns of any other class.

The number of masks needed and the parameters of each masking function are determined as follows. Consider a simple two class problem in which "class A" is bounded by a unit circle centered at the origin and "class B" is the rest of the allocated two-dimensional space shown in FIG. 8. A total of 18 sample patterns are shown as the training set (eight patterns from class A and ten patterns from class B) as shown in Table 1.

TABLE 1

|  | $X_1$ | $X_2$ | Class |
|---|---|---|---|
| $x_1$ | 0 | 1 | A |
| $x_2$ | 1 | 0 | A |
| $x_3$ | 0 | -1 | A |
| $x_4$ | -1 | 0 | A |
| $x_5$ | -0.5 | -0.5 | A |
| $x_6$ | 0.5 | 0.5 | A |
| $x_7$ | 0.5 | -0.5 | A |
| $x_8$ | -0.5 | -0.5 | A |
| $x_9$ | -0.75 | 0.75 | B |
| $x_{10}$ | 0.75 | -0.75 | B |
| $x_{11}$ | 0.75 | -0.75 | B |
| $x_{12}$ | -0.75 | -0.75 | B |
| $x_{13}$ | 0 | 1.1 | B |
| $x_{14}$ | 0 | -1.1 | B |
| $x_{15}$ | 1 | 1 | B |
| $x_{16}$ | 1 | -1 | B |
| $x_{17}$ | -1 | -1 | B |
| $x_{18}$ | -1 | 1 | B |

A priori, it is not known how many elementary masks will suffice for any of the class regions. Thus, an attempt is first made to define a single elementary mask (usually quadratic or quadratic polynomial) which will cover the whole class region. If this fails, the sample patterns are generally split into two or more clusters (using a clustering procedure) and then attempts are made to define separate masks for each of the clusters. If that should fail, the clusters are further split for separate masking until masks are provided for each ultimate cluster. The goal is to define as large a mask as possible to include as many of the sample patterns within a given mask as is feasibly possible thereby minimizing the total number of masks required to cover a given region. As stated, when the pattern class cannot be covered with a limited number of masks, the unmasked region is successively subdivided until all unmasked sample patterns are ultimately masked.

Figure 8:
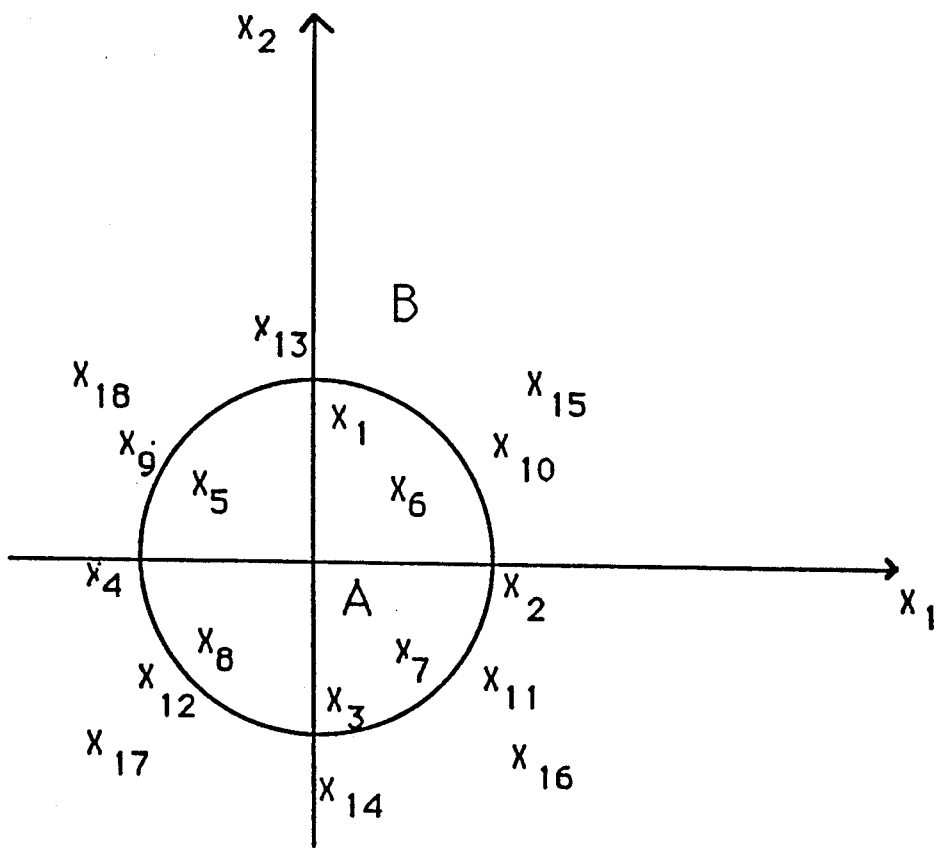
FIG. 8 is a graphic showing classes A and B and the training samples thereupon in accordance with the present invention.

Referring to the training patterns shown in FIG. 8, one first tries to mask class A with a single masking function such as quadratic polynomial type of the form shown by equation (2), supra, which provides a mask of the form:

$$f_A(x) = a_1x_1 + a_2X_2 + b_1X_1^2 + b_2X_2^2 + c \quad (3)$$

so that for the input patterns in class A, $f_A(x)$ is at least slightly positive to ensure a finite separation between classes (i.e., not allowing common boundaries between classes) and ensure a small, but finite, separation of the boundaries. To determine the parameters $a_1$, $a_2$, $b_1$, $b_2$ and c of the masking function in equation (3) from the sample patterns, a linear program is established which essentially states that "develop a masking function so that sample patterns from class A are at least slightly positive and those from class B are at least slightly negative". A linear programming formulation can be used because quadratics and quadratic polynomials (and polynomials in general) are linear functions of their parameters. Of course, as will be hereinafter discussed in detail, linear program set up in this case is as follows:

Minimize $\epsilon$ s.t.

$$f_A(x_1) \geq \epsilon \quad (4)$$

.
.
.

$f_A(x_8) \geq \epsilon$
$f_A(x_9) \leq -\epsilon$

.
.
.

$f_A(x_{18}) \leq -\epsilon$ $\epsilon \geq$ a small positive constant.

This procedure generally uses a lower bound of 0.001 for $\epsilon$. Written in terms of the parameters, the LP will be as follows:

Minimize $\epsilon$ s.t.

$a_2 + b_2 + c \geq \epsilon$ for pattern $x_1$
$a_1 + b_1 + c \geq \epsilon$ for pattern $x_2$
$-a_2 + b_2 + c \geq \epsilon$ for pattern $x_3$
$-a_2 + b_1 + c \geq \epsilon$ for pattern $x_4$

.
.
.

$a_1 + a_2 + b_1 + b_2 + c \leq -\epsilon$ for pattern $x_{15}$
$a_1 - a_2 + b_1 + b_2 + c \leq -\epsilon$ for pattern $x_{16}$
$-a_1 - a_2 + b_1 + b_2 + c \leq -\epsilon$ for pattern $x_{17}$
$-a_1 + a_2 + b_1 + b_2 + c \leq -\epsilon$ for pattern $x_{18}$ $\epsilon \geq$ a small positive constant.

The solution to this LP is $a_1=0$, $a_2=0$, $b_1=-1$, $b_2=-1$ and $c=1$ with $\epsilon$ at its lower bound. The single masking function for class A therefore, is $$f_A(x) = 1 - X_1^2 - X_2^2 + \epsilon. \quad (6)$$

For any pattern in class A, $f_A(x) \geq \epsilon$, and for any pattern in class B, $f_A(x) \leq -\epsilon$. For $f_A(x)$ between $-\epsilon$ and $\epsilon$, the class will be undetermined. In this example, it is easy to determine the masking function for class B. If we set $f_B(x) = -f_A(x)$, it will work. So, $$f_B(x) = X_1^2 + X_2^2 - 1 - \epsilon. \quad (7)$$

For any pattern in class B, $f_B(x) \geq \epsilon$, and for any pattern in class A, $f_B(x) \geq -\epsilon$. The masking function for class B can also be determined by setting up another linear program. It will have the following form:

Minimize $\epsilon$ s.t.

$$f_B(x_1) \leq -\epsilon \quad (8)$$

.
.
.

$f_B(x_8) \leq -\epsilon$
$f_B(x_9) \geq \epsilon$

.
.
.

$f_B(x_{18}) \geq \epsilon$ $\epsilon \geq$ a small positive constant, where $f_B(x)$ is of the same form as $f_A(x)$ in (3). This, similarly, can be expanded into the parametric form shown in equation (5). Note that the single mask for class B is a nonconvex mask (covers the whole space except the unit circle) and works.

Figure 9:
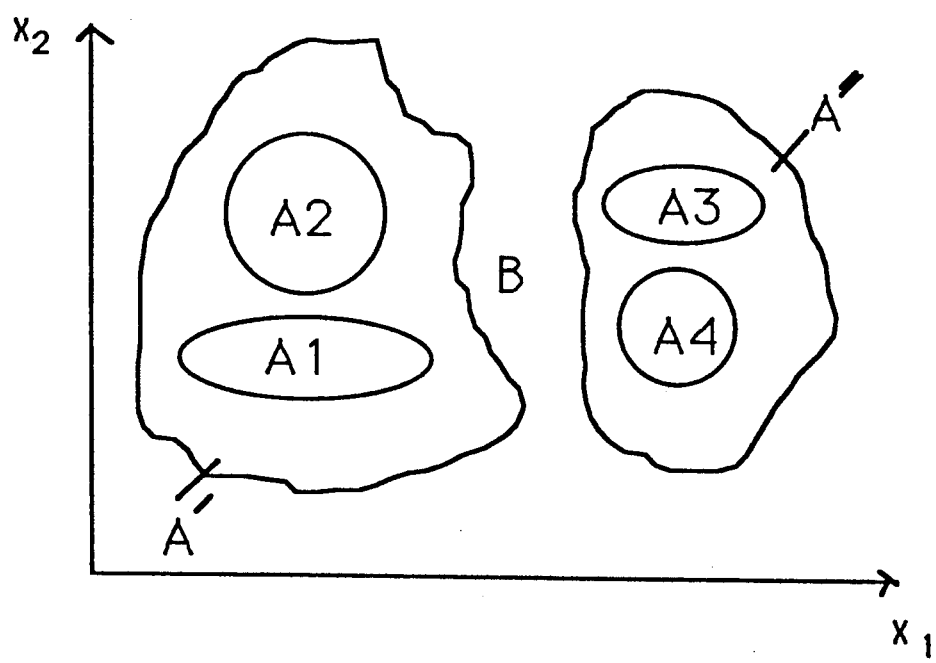
FIG. 9 is a graphic of a problem with disjoint class regions.

Hypothetical application of the method hereof is shown by FIG. 9 in which class A includes 4 disjoint regions (A1, A2, A3 and A4) and class B comprises all of the area less class A, that is, the rest of the space. According to the present invention, the first effort will be to define a single mask for each of the two classes. To define a single mask for class A, a LP is set up as follows:

Minimize $\epsilon$ s.t.

$$\quad (9)$$

$f_A(x_i) \geq \epsilon$ for all sample patterns $x_i$ belonging to class A,
$f_A(x_i) \leq -\epsilon$ for all sample patterns $x_i$ belonging to class B,
and
$\epsilon \geq$ a small positive constant, where $f_A(x)$, let's say, is a quadratic. This linear program is infeasible thereby indicating that a single mask cannot be developed for class A. Next, the class A sample patterns are divided into two clusters using a conventional clustering procedure. As shown in FIG. 9, the sample patterns from indicated regions A1 and A2 define one cluster (identified as region A') and those from A3 and A4 define a second cluster identified as region A". Next, then try to mask A' and A" separately. The LP for the A' cluster will be:

Minimize $\epsilon$ s.t.

$$\quad (10)$$

$f_A(x_i) \geq \epsilon$ for all sample patterns $x_i$ belonging to class A,
$f_A(x_i) \leq -\epsilon$ for all sample patterns $x_i$ belonging to class B,
and -continued $\epsilon \geq$ a small positive constant, Note that the sample patterns of cluster A" are ignored in the above formulation.

Similarly, the LP for cluster A" will be:

Minimize $\epsilon$ s.t.

$$f_{A''}(x_i) \geq \epsilon \quad \text{for all sample patterns } x_i \text{ belonging to cluster A''},$$
$$f_{A''}(x_i) \leq -\epsilon \quad \text{for all sample patterns } x_i \text{ belonging to class B,}$$

and $\epsilon \geq$ a small positive constant. (11)

Here, the sample patterns in cluster A' are ignored. Both of these LPs are infeasible and further clustering must be used to breakup clusters A' and A". Splitting each of these clusters into two will produce four clusters which will correspond to the four original disjoint regions A1, A2, A3 and A4. Four different linear programs must be established for these four clusters, using equations (10) and (11), to define their masks. Now, the linear programs are feasible and four masking functions have been defined for class A which correspond to the four disjoint regions. This is the "divide and conquer" procedure required to define operable masks.

The linear programming (LP) system of the present invention, by setting up explicit constraints on the sample patterns, takes advantage of learning by comparison, a technique used very effectively by humans. By setting up each sample pattern as a constraint, the linear programming system allows an explicit comparison of the class regions so that learning is rapid. Neural network training, which is done by presenting one sample pattern at a time, denies this explicit parallel (simultaneous) view of the class regions, thereby retarding the learning process.

Also, even though the computations inside a neural net are done in parallel once a single pattern vector is presented, a net does not allow the parallel (simultaneous) presentation of the whole training set. A neural network, therefore, exploits one kind of parallelism but fails to exploit the other kind, which limits its effectiveness. As discussed above, the masking functions in accordance with this invention can be set up as a network which allows them to be computed in parallel. The linear program system is thus able to exploit parallelism in the recognition or classification phase. The generation of masking functions can also be done in parallel by setting up the different LP's on parallel machines.

Figure 12:
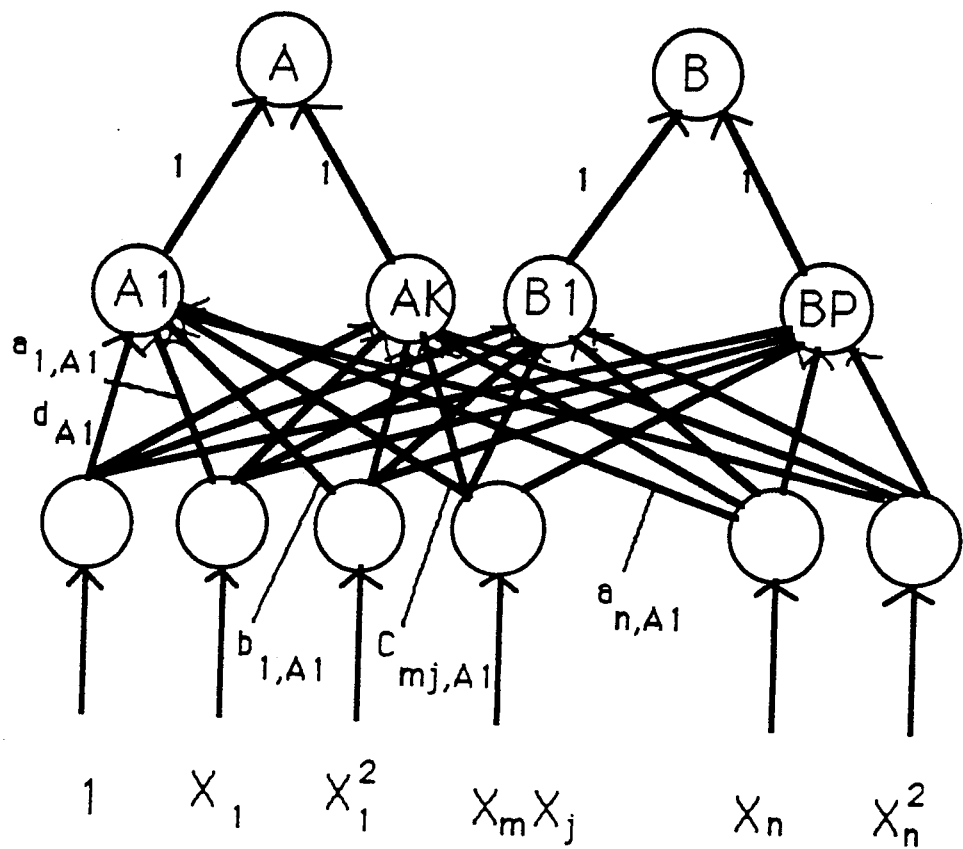
FIG. 12 illustrates masking functions placed on a network to exploit parallelism in computation.

The masking functions can be set up on a network structure similar to neural networks, so that the classification or recognition phase can exploit parallelism in its evaluation. FIG. 12 shows in a simpler way than that demonstrated in FIGS. 1-8 how a neural net type network structure can be constructed to evaluate masking functions in parallel when simple quadratics are used as masks. Class A has k masking functions and class B has p. Each masking function is evaluated in parallel at nodes $A_1$ through $A_k$ and $B_1$ through $B_p$. The output of these nodes is 1 if the mask is at least slightly positive ($\geq \epsilon_i$) and zero otherwise. A hard limiting nonlinearity (Lippman, R. P., "An Introduction to Computing with Neural Nets," *IEEE ASSAP Magazine* Vol. 4, pp. 4-22, April 1987). can be used at these nodes. The class A masking function nodes $A_1$ through $A_k$ are connected to the final output node A for the class and likewise for class B. The output of node A is 1 if at least one of the inputs is 1, otherwise it is 0 and likewise for node B. Again, hard limiting nonlinearities can be used at these final output nodes. An input pattern is in class A if the output of node A is 1 and that of node B is 0 and vice versa. The masking function coefficients are placed on the connections between the input nodes and middle layer nodes.

Figure 10:
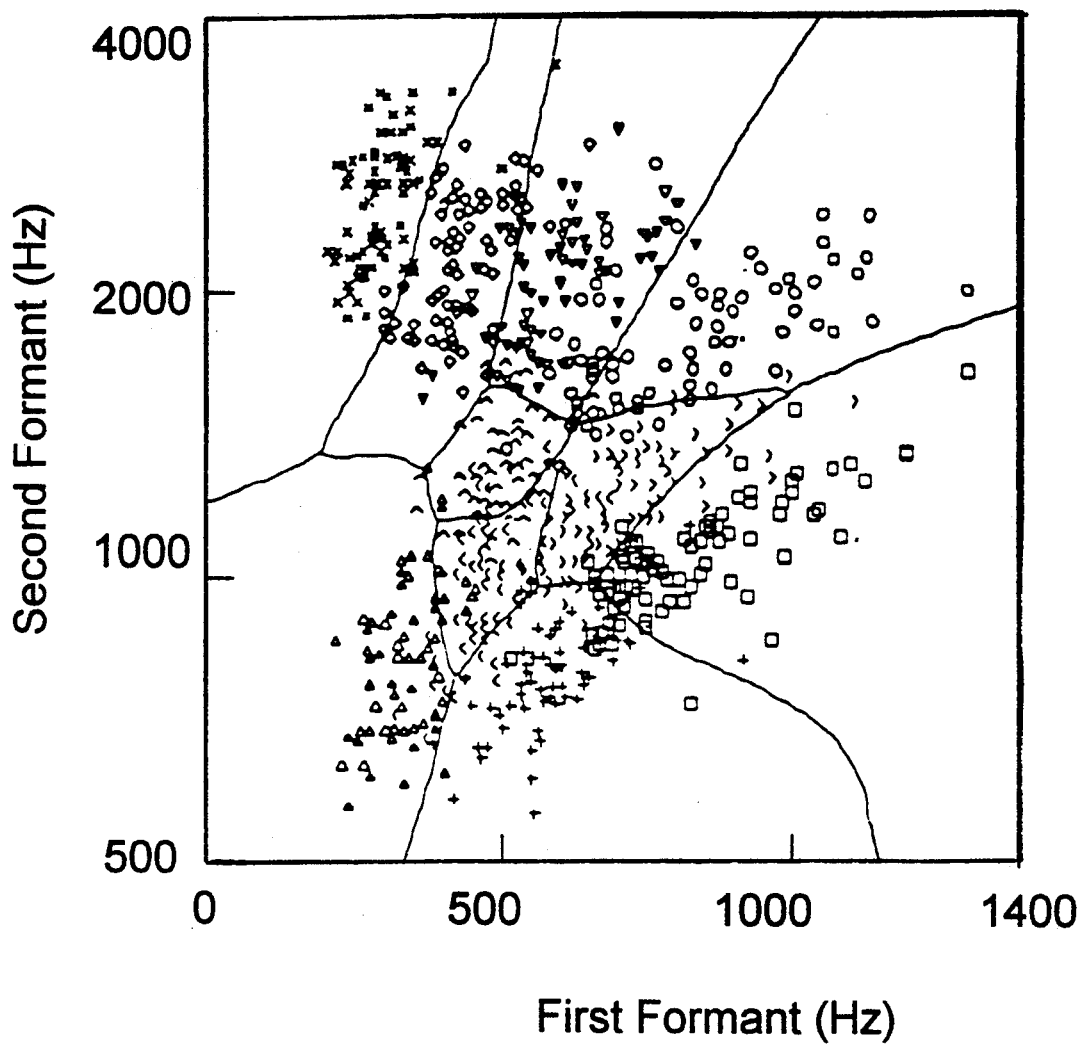
FIG. 10 is a graphic showing outliers in a vowel classification problem.

Many classification problems, by their very nature, generate pattern vectors belonging to a class which fall outside the core class region. For example, Lippman, R. P., "Neural Network Classifiers for Speech Recognition," *The Lincoln Laboratory Journal*, Vol. 1 [1988], reports how vowel patterns, spoken in a word context by 67 persons, including men, women, and children, not only have certain core regions but also have outliers as shown in FIG. 10. The basic concept underlying all classification systems is to extract the core region of a class from the information provided (the training set) and to throw out the outliers. If an error minimization criterion is to be used in measuring the success of a classification machine, then a machine is said to be ideally constructed (with zero error on the training set) if it forms class regions that include every sample pattern in the training set within proper class boundaries. Such ideal machines are purposely not constructed because of the presence of outliers, even though it is feasible to do so. For example, neural networks (multi-layer perceptrons), when provided with enough hidden nodes, will construct such ideal machines. However, the outliers are generally treated as anomalies (errors), as can be seen from the neural net decision boundaries in FIG. 10, which closely correspond to the ones drawn by a human expert. Human speech recognition systems, for example, function the same way. They are generally not tuned to recognize the infrequently encountered foreign pronunciation of words in a language (the outliers). Thus an accent problem (error in recognizing outliers) exists in voice recognition.

Because of the outlier phenomenon, the classical statistical techniques model class patterns as a random phenomenon with probability distributions. In contrast, the method of the present invention has no probability distribution assumptions about the class patterns. Instead, the present disclosure utilizes a heuristic procedure to weed out the outliers when they are present in a problem. When no outliers are present, the masking functions can be developed using the LP technique. Thus, Phase I is directed to weeding out the outliers and Phase II to the masking function development.

To weed out the outliers of a class, the idea is to breakup the sample patterns in the class into small clusters of an average size of about three or four patterns (this average size may be problem dependent), using a clustering procedure, such as the K-means clustering algorithm (Duda, R. O. and P. E. Hart, *Pattern Classification and Scene Analysis*, John Wiley & Sons, New York [1973], Young, T. Y. and T. W. Calvert, *Classification, Estimation and Pattern Recognition*, American Elsevier Publishing Co., New York [1974]). Thus, if a class has 200 sample patterns and if the average cluster size is four, the clustering procedure will be required to get 200/4 = 50 clusters out of the 200 samples. Since the outliers are generally isolated patterns, this procedure will force the outliers into forming separate clusters by themselves. These single or double pattern clusters may then be dropped from the training set as being outliers. The assumption is that the core area of a class is quite dense and that the clusters there will be at least as large as the average size when the clustering procedure is forced to form a fixed number of clusters.

Figure 11:
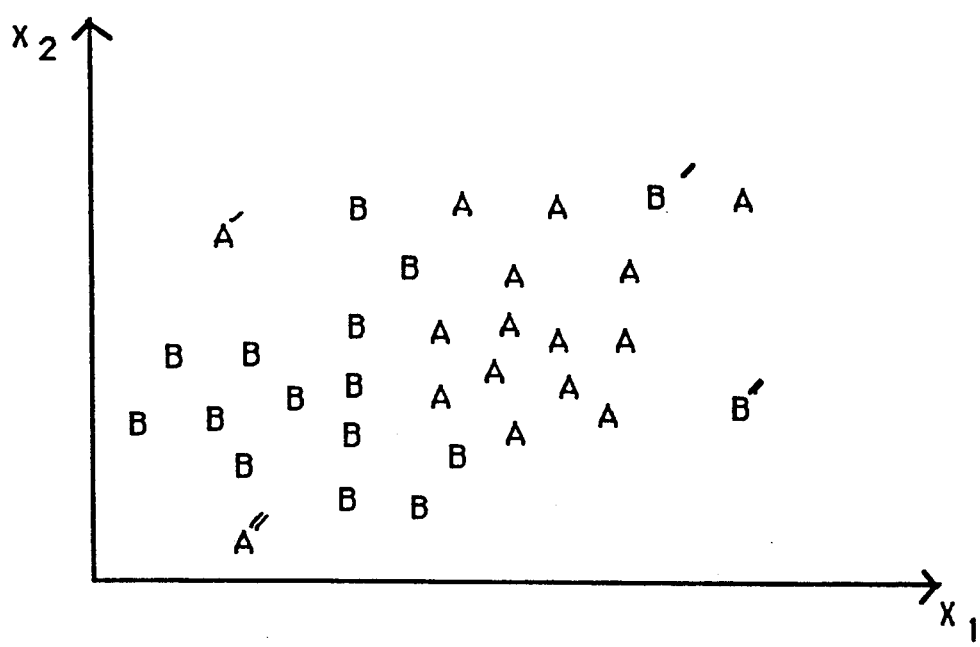
FIG. 11 is a graphic showing sample patterns from two classes A and B.

FIG. 11, for example, shows 16 sample patterns from each class A and B. If each set of patterns is broken into clusters of average size 4, then a clustering procedure will be required to form 16/4=4 clusters for each class. This will cause the outlier patterns A', A'', B, and B'' to fall out by themselves into isolated clusters of their own with the remaining patterns from each class forming two clusters giving a total of four clusters. The single pattern clusters containing the outliers can then be thrown out of the training set.

In general, the definition of an outlier is difficult. It will not drastically affect the effort to extract the core class region if this procedure inadvertantly discards a few patterns close to or inside the core boundary. However, if there are too many or too few outliers, a different average cluster size should be employed. Depending on the classification problem, one can use an estimate for the percentage of outliers present (e.g., 5 or 10%) and try to weed out about that much.

Again, it does not drastically affect the core class region if a few patterns along the core boundary or inside the core are inadvertently discarded. Also, it does not affect the core class region if a few genuine outliers are missed. Most of the remaining outliers can be weeded out during the masking function construction phase which also involves sequential reclustering of class sample patterns into smaller clusters in order to get feasible masks (i.e., feasible LP solutions). In this sequential reclustering and masking process, any cluster whose size drops below a certain threshold cluster size e.g., $\leq 2$) can be dropped from the training set. Any remaining large outlier groups will get masked either as part of the core region or as disjoint class regions. The basic goal is to accomplish as much outlier cleanup as possible before the masking functions are generated and then cleanup some more during the masking phase.

All of the foregoing can be defined in terms of a training algorithm. The training algorithm is stated in general terms. When using the algorithm, certain choices have to be made regarding heuristics to use and parameter settings as is hereinafter described.

FIG. 13 is a flowchart of the training algorithm and shows the essential logic of the software associated herewith. For ease of description, the several steps have been numbered. Thus the set of tasks depicted herein as phase I is labeled 50 and functions to weed out the outliers. The set of tasks depicted herein as phase II is labeled 51 and functions to develop the masking functions once the outliers have been weeded out by phase I.

The training algorithm embodied herein starts at 52 with a set of training examples which establishes an average breakup cluster size (m) at 53. Once the average cluster size m is set at 52, the sample patterns in each class are broken up by means of a clustering procedure at 54, the resulting clusters having less than q sample patterns contain therein are thrown out as outliers at 55. The percentage of samples weeded out as outliers is evaluated at 56 and if reasonable, the method proceeds to phase II. If the percentage of outliers is not reasonable, the cluster size m is adjusted up or down at 57 and the classes are resized at 54, 55.

In phase II 51, masking functions are developed one class at a time. After initialization of the classes at 58, 59 and 60, a linear program ("LP") is defined and solved for each cluster in a class in 61. If all of the LPs become feasible at 62, masking of next class begins at 63, 65 unless all have been done at 64. If all the LPs are not feasible at 62, the feasible LP solutions are saved at 66 and infeasible patterns are collected at 67 and subdivided at 68 into a larger number of clusters using a clustering procedure. Small clusters of size $<=q$ are dropped from the training set as outliers at 69 and LPs are set up for the remaining clusters for masking at 70. The procedure loops back to 62 to test if the class has been fully masked.

Stated more precisely, the algorithm embodied in the present invention evolves as follows:

Phase I—Weed out outliers of each class (1) Set average breakup cluster size m to an appropriate value.
(2) Initialize class index i; i=0.
(3) Let i=i+1. If i>K, where K is the total number of classes, go to step 6.
(4) For class i, breakup (group) the sample patterns into [$P_i/m$] small clusters using a clustering procedure such as the k-means clustering technique where $P_i$ is the number of sample patterns in class i. Go to step 3 without grouping if [$P_i/m$] <2.
(5) Delete from the training set all class i sample patterns that belong to generated clusters of size strictly less than q, where q<m, considering them to be outliers of class i. The threshold size q will be problem dependent. Go to step 3.
(6) If the percentage of sample patterns weeded out as outliers is considered too high, increase average cluster size m and go back to step 2. If the percentage is considered too low, decrease the average cluster size and go back to step 2. Otherwise, when the percentage is reasonable, proceed to phase II.

Phase II—Construct masking functions for each class (1) Initialize class index i; i=0
(1) Let i=i+1. If i>K, where K is the total number of classes, stop. Otherwise, set j=1 and $KL_j$=1, where $KL_j$ is the total number of clusters remaining to be masked for class i at the jth stage of breaking up unmasked patterns of class i. The unmasked clusters at the jth stage are indexed as $C_{j,1}$, $C_{j,2}$. . . , $C_{j,KLj}$.
(3) Using a linear masking function f(x), set up a LP as follows for each unmasked cluster $C_{j,k}$, $k = 1, \ldots, KL_j$.

Minimize $\epsilon$ s.t.

$f_{C_{j,k}}(x_p) \geq \epsilon$ for all pattern vectors $x_p$ in cluster $C_{j,k}$ of class i,
$f_{C_{j,k}}(x_p) \leq -\epsilon$ for all pattern vectors $x_p$ in classes other than class i, the class being currently masked, where is the masking function for cluster $C_{j,k}$ of class i. Solve each LP for each unmasked cluster. If all LP solutions are feasible and optimal, then masking of class i is complete. Go to step 2 to mask next class. Otherwise, when some or all LPs are infeasible, save all feasible masking functions obtained and go to step 4.

(4) Let $KL'_j$ be the number of clusters with infeasible LP solutions at the jth stage. Regroup (breakup) the sample patterns in these infeasible clusters into [$KL'_j \cdot h$ or ($KL'_j+h$)] smaller clusters using a clustering procedure. A typical value of h might be 2 which can double the number of clusters generated. Delete from the training set all class i sample patterns that belong to generated clusters of size q or less, considering them to be outliers of the class.

(5) Set $j=j+1$ (i.e., go to the next stage). Let $KL_j$ be the new total number of clusters remaining to be masked for class i at this stage, these unmasked clusters being indexed as before as $C_{j,1}, C_{j,2}, \ldots, C_{j,KL_j}$. Go to step 3.

If phase I is not used and if no clusters are dropped in step 4 of phase II, the algorithm will produce a classification system with zero error on the training set, as all sample patterns will be masked properly.

In step 3 of phase II, one can use any suitable linear masking function—a function linear in the parameters to solve for. A general polynomial with enough high-order terms is capable of masking (covering) approximately any kind of nonconvex region. It can thus prevent further splitting of a class region that occurs with the use of simpler quadratic masks. However, higher-order polynomials can cause numerical problems. Depending on the problem, one can experiment some with different masking functions. It is possible to use trigonometric, logarithmic, exponential and other functions in the mask as long as they are linear in terms of the parameters. Thus, a masking function can be of the form:

$$f(x) = a \sin X_1 + b \cos X_2 + c (\log X_3/\log X_4).$$

The reclustering of infeasible cluster patterns in step 4 of phase II can be done in a number of different ways. One approach is to breakup each infeasible cluster into 2 or 3 clusters. It is not a minimal breakup strategy. One can breakup faster or slower, depending upon the cluster size at hand. One strategy might be to breakup faster (e.g., into 4 or 6 clusters at a time) when the infeasible cluster size is large. It will save some intermediate breakup and LP solution trials. Yet another strategy might be to recombine the unmasked cluster patterns and then recluster.

Any of the known clustering algorithms may be used herein depending on the exigencies of the particular dataset being classified. A number of such algorithms are reported by Duda and Hart, op cit, and Young and Calvert, op cit. Because the different clustering algorithms behave differently when asked to generate a fixed number of clusters from a given dataset, some experimentation with different algorithms may be necessary to determine which is the most appropriate for a given problem. The clustering algorithm used in phase I can be different from the one used in phase II. All of this is within the ordinary skill of the artisan and need not be belabored here.

In step 6 of phase I, one can use some knowledge of the problem in estimating the percentage of outliers present and use that as a guide in weeding out outliers. The method will work even when one does not have a good estimate of outliers present.

Presence of outliers in phase II might cause some class regions to fractionate. Since all of the outliers will be removed after phase II, it might not be a bad idea to go through phase II again (i.e., make a second pass) to obtain masking functions for the classes with minimal breakup. LP solvers are extremely fast these days and a second pass through phase II as a clean-up operation will not be that expensive timewise.

If the set of patterns in a class is large, one can break it up into some number of clusters before attempting any masking. So, in step 2 of phase II, $KI_j$ need not be 1 for $j=1$.

In step 4 of phase II, one can test if any of the patterns in infeasible clusters are covered by an existing mask. If so, these patterns can be taken out of the infeasible clusters before reclustering.

From the foregoing, it is readily apparent means and methods for pattern classification using linear programming has been herein described and illustrated which fullfills all of the aforestated objectives in a remarkably unexpected fashion. It is of course understood that such modifications, adaptations and alterations as may readily occur to the artisan confronted with this disclosure are intended with the spirit of the present invention which is limited solely by the scope of the claims appended hereto.

Accordingly, what is claimed is:

1. An information processing system for separating a plurality of patterns into a discrete set of classes, each of said patterns having a plurality of input signals disposed therewithin, said system comprising: a pattern class separator having input terminals, output terminals, and a plurality of assemblies, each said assembly being operatively disposed between said input terminals and said output terminals to identify one of said discrete set of classes, each such assembly having threshold element means, summer means, a plurality of junction elements, and a plurality of product and power means, each of said product and power means receiving one or more of said input signals from said input terminals and producing a product therefrom for delivery to one of said junction elements, each of said junction elements receiving either one of said input signals or one of said produced products from one of said product and power means and multiplying said input signal or said produced product by a preselected constant to produce a junction element output, said summer means receiving all of said junction element outputs and totaling them to provide a summer output, said threshold element means receiving said summer output and measuring said summer output against a preselected value set therein to determine whether said summer output is a member of said one of said discrete set of classes and producing an assembly output which will have a value of 1 when said output equals or exceeds said preselected value and which will have a value of 0 when said assembly output is less than said preselected value, said value of 1 signifying that said summer output corresponds to said one of said discrete set of classes, said assembly output being transmitted to one of said output terminals of said pattern class separator to create a pattern class separator output.

2. A system according to claim 1 further comprising class identifying means responsive to said pattern class separator outputs to produce identifying means outputs indicative of the particular class of each said pattern class separator outputs produced by said system.

3. An information processing system according to claim 2 in which said class identifying means is operatively connected to said pattern class separator to receive the output signals of said pattern class separator to produce class identifying outputs therefrom.

4. An information process system according to claim 3 in which each of said output signals indicates the discrete classification of each of said patterns introduced to said system.

5. An information process system according to claim 3 in which said output signals indicate the discrete classification of each of said patterns introduced to said system.

6. An information processing system according to claim 2 in which said class identifying means comprises input terminals, output terminals, and a plurality of assemblies, said input terminals being connected to receive input signals consisting of the output of said pattern class separator, each said assembly being operatively interposed between said input terminals and said output terminals and each being operative to identify the pattern of a designated one of said classes, each such assembly having threshold element means and summer means, said summer means receiving all of said input signals corresponding to said designated class of said assembly and totalling said input signals to provide a summer output, said threshold element means receiving said summer output and comparing said summer output against a preselected value set therein to determine whether said summer output is a member of said designated class thereby producing an assembly output which will have a value of 1 when said summer output equals or exceeds said preselected value and which will have a value of 0 when said summer output value if less than said preselected value, said value of 1 signifying that said summer output corresponds to said designated class.

7. An information process system according to claim 6 in which said threshold means comprises a trigger circuit operatively associated therewith and actuatable in response to said summer output thereto when said summer output has a value which is at least equal to said preselected threshold value.

8. An information process system according to claim 1 in which said threshold means comprises a trigger circuit operatively associated therewith and actuatable in response to said summer output when said summer output has a value which is at least equal to said preselected threshold value.

9. An information processing system according to claim 1 further comprising class identifying means having input terminals, output terminals, and a plurality of assemblies, said input terminals being connected to receive input signals consisting of the outputs of said pattern class separator, each said assembly being operatively interposed between said input terminals and said output terminals and each being operative to identify the pattern of a designated one of said classes, each such assembly having threshold element means and summer means, said summer means receiving all of said input signals corresponding to said designated class of said assembly and totalling said input signals to provide a summer output, said threshold element means receiving said summer output and comparing said summer output against a preselected value set therein to determine whether said summer output is a member of said designated class thereby producing an assembly output which will have a value of 1 when said summer output equals or exceeds said preselected value and which will have a value of 0 when said summer output value if less than said preselected value, said value of 1 signifying that said summer output corresponds to said designated class.

10. An information processing system according to claim 9 in which said threshold means comprises a trigger circuit operatively associated therewith and actuatable in response to said summer output when said summer output has a value which is at least equal to said preselected threshold value.

11. An information processing system according to claim 10 in which said output signals indicate the discrete classification of each of said patterns introduced to said system.

12. An information processing system according to claim 9 in which said output signals indicate the discrete classification of each of said patterns introduced to said system.

* * * * *